US012045749B2

(12) United States Patent
Choi

(10) Patent No.: US 12,045,749 B2
(45) Date of Patent: Jul. 23, 2024

(54) APPARATUS AND METHOD OF PROCESSING WORK CHAT ROOM

(71) Applicants: DELTA PDS CO., LTD., Seoul (KR); Jae Ho Choi, Seoul (KR)

(72) Inventor: Jae Ho Choi, Seoul (KR)

(73) Assignees: DELTA PDS CO., LTD., Seoul (KR); Jae Ho Choi, Seoul (KR)

(*) Notice: Subject to any disclaimer, the term of this patent is extended or adjusted under 35 U.S.C. 154(b) by 27 days.

(21) Appl. No.: 17/362,360

(22) Filed: Jun. 29, 2021

(65) Prior Publication Data

US 2022/0092518 A1 Mar. 24, 2022

(30) Foreign Application Priority Data

Sep. 23, 2020 (KR) .................. 10-2020-0123030
Nov. 12, 2020 (KR) .................. 10-2020-0151009
Nov. 12, 2020 (KR) .................. 10-2020-0151081

(51) Int. Cl.
G06Q 10/00 (2023.01)
G06Q 10/0631 (2023.01)
H04L 51/216 (2022.01)

(52) U.S. Cl.
CPC ........... G06Q 10/063114 (2013.01); G06Q 10/063112 (2013.01); G06Q 10/06316 (2013.01); H04L 51/216 (2022.05)

(58) Field of Classification Search
CPC ... G06Q 10/063114; G06Q 10/063112; G06Q 10/06316; G06Q 10/06393;
(Continued)

(56) References Cited

U.S. PATENT DOCUMENTS 6,889,196 B1* 5/2005 Clark ................. G06Q 10/0635
705/7.38
2008/0091782 A1* 4/2008 Jakobson ............... G06Q 10/10
709/206

(Continued)

FOREIGN PATENT DOCUMENTS

JP 2002-251508 A 9/2002

OTHER PUBLICATIONS

Khan, Faisal M., et al. "Mining chat-room conversations for social and semantic interactions." Computer Science and Engineering, Lehigh University (2002): 12. (Year: 2002).*

Primary Examiner — Joseph M Waesco
(74) Attorney, Agent, or Firm — Paratus Law Group, PLLC

(57) ABSTRACT

A work chat room processing apparatus includes: a work chat room processing part which processes a plurality of work chat rooms set up for each piece of work, each of the work chat rooms being implemented through a message thread comprised of a task object message designating a task owner and a task assignee and a non-task object message; a task object database processing part which registers a task object in the task object message by work chat room in a task object database; a work progress status processing part which creates work progress status summary information based on current context information by searching the task object database; and a work processing part which, upon occurrence of a user interaction, provides the current context information to the work progress status processing part, receives the work progress status summary information.

13 Claims, 13 Drawing Sheets

(58) Field of Classification Search
CPC ......... G06Q 10/06395; G06Q 30/0185; G06Q 10/06398; G06Q 10/00; G06Q 10/02; G06Q 10/06; G06Q 10/10; G06Q 30/02; H04L 51/216

See application file for complete search history.

(56) References Cited

U.S. PATENT DOCUMENTS

| | | | | |
|---|---|---|---|---|
| 2008/0209417 A1* | 8/2008 | Jakobson | ............. | G06F 9/4856 718/100 |
| 2008/0279202 A1* | 11/2008 | Choi | ............. | H04L 12/2836 455/41.2 |
| 2011/0208822 A1* | 8/2011 | Rathod | ............. | G06Q 30/02 709/206 |
| 2012/0123835 A1* | 5/2012 | Chu | ............. | G06Q 30/0239 705/14.12 |
| 2014/0244329 A1* | 8/2014 | Urban | ............. | G06Q 10/063114 705/7.15 |
| 2014/0310132 A1* | 10/2014 | Culver | ............. | G06Q 10/101 705/26.81 |
| 2014/0349627 A1* | 11/2014 | Choi | ............. | H04W 4/12 455/566 |
| 2015/0363092 A1* | 12/2015 | Morton | ............. | G06F 3/04817 715/752 |
| 2016/0026960 A1* | 1/2016 | Carnahan | ............. | G06Q 10/06393 705/7.39 |
| 2016/0110677 A1* | 4/2016 | Aynsley-Hartwell | ............. | G06Q 10/20 705/7.15 |
| 2016/0132222 A1* | 5/2016 | Yoo | ............. | G06F 3/016 715/763 |
| 2016/0224939 A1* | 8/2016 | Chen | ............. | G06Q 10/06311 |
| 2016/0342927 A1* | 11/2016 | Reznik | ............. | H04L 51/046 |
| 2017/0011344 A1* | 1/2017 | Choi | ............. | G06Q 10/04 |
| 2017/0185212 A1* | 6/2017 | Jeong | ............. | G06F 3/04883 |
| 2017/0289073 A1* | 10/2017 | Crusson | ............. | G06F 3/0482 |
| 2018/0302357 A1* | 10/2018 | Cohen | ............. | H04L 51/212 |
| 2020/0122855 A1* | 4/2020 | Conaway | ............. | B64D 43/00 |
| 2020/0303063 A1* | 9/2020 | Sharma | ............. | G16H 40/67 |
| 2022/0076207 A1* | 3/2022 | Culver | ............. | G06F 30/13 |

* cited by examiner

| < | 021.2021_0000 / 11. 0000 |

Project | Plan 1 | 2 | Do | Check | Act [2]

Description [Plan] No. of people in chat room

1110 — Plan : Planned 1 / In progress 3 / Overdue 0 / Confirmed 3

2021-05-28 10:01

1120 — [Team] 25. OOO

Hello, Mr. @~~~
2021-06-04 10:01

[Team] 23. OOO

Hello, Mr. @~~~
2021-06-04 10:01

1130 — [Team] 28. OOO

Hello, Mr. @~~~
2021-06-07 10:01

FIG. 11B 021.2021_0000 / 11. 0000

Project | Plan 1 | Do | Check | Act 1

Note | Task | No. of people in chat room

1140 — Task : New : 0 / Doing : 1 / Done : 1 / Confirmed : 0

You have read this far.

OOO→OOO

Hello, Mr. @~~~

1150 — OOO→OOO

Hello, Mr. @~~~

1160 — OOO→OOO

Hello, Mr. @~~~

APPARATUS AND METHOD OF PROCESSING WORK CHAT ROOM

CROSS REFERENCE TO PRIOR APPLICATIONS

This application claims priority to and the benefit Korean Patent Application Nos. 10-2020-0151009 filed on Nov. 12, 2020, 10-2020-0151081 filed on Nov. 12, 2020, and 10-2020-0123030 filed on Sep. 23, 2020, which are hereby incorporated by reference in their entirety.

BACKGROUND

The present disclosure relates to a task schedule display technology and, more particularly, to a technology that intuitively shows a task along with phases of work progress and a task schedule.

Generally, groupware refers to software that supports group tasks, allowing members of a company or the like to work collaboratively within a computer-networked workplace, or an architecture including such software. It usually means a software system used to enable members of a company, organization, or group to work collaboratively with more efficiency within a computer-networked workplace.

Groupware enables computer users within a company to process tasks such as drawing up, approving, and keeping documents through their personal computers connected by a communication network such as LAN. Groupware is a combination of task software such as collaborative writing systems, numerical computation, and databases, with additional features such as electronic mail, electronic bulletin boards, electronic approval, data sharing, messengers, electronic meetings, and so on.

For efficient use of groupware, a lot of emphasis is being placed on messenger features. Messengers are applications that transmit textual and graphical messages between users, and may be implemented by chat rooms that multiple users can join. In an embodiment, an internet messenger may include a mobile messenger which runs in a mobile environment (e.g., cellular phone)—for example, KakaoTalk, Line, WeChat, and Facebook Messenger. Such internet messengers are being used in increasingly diverse ways for task management and progress.

PRIOR ART DOCUMENT

[Patent Document]
Japanese Patent Application No. 2001-385042 (18 Dec. 2001)

SUMMARY

According to an embodiment of the present disclosure, it is possible to display a task schedule at a glance, such as the current progress of work and the remaining days and hours. That is, the present disclosure provides a task management technology that helps manage a task schedule without fail by providing a task assignee with visualized data they can intuitively recognize if the deadline is approaching or has arrived for a task or for each instance of a periodically recurring task.

Furthermore, the present disclosure provides a technology that helps manage a task schedule without fail by visualizing the progress of the schedule through progress bars for multiple tasks that occur simultaneously and providing reminders related to task deadlines.

An exemplary embodiment of the present disclosure provides a work chat room processing apparatus including: a work chat room processing part which processes a plurality of work chat rooms set up for each piece of work, each of the work chat rooms being implemented through a message thread comprised of a task object message designating a task owner and a task assignee and a non-task object message; a task object database processing part which registers a task object in the task object message by work chat room in a task object database; a work progress status processing part which creates work progress status summary information based on current context information by searching the task object database; and a work processing part which, upon occurrence of a user interaction, provides the current context information to the work progress status processing part, receives the work progress status summary information, and includes the work progress status summary information for each status of work progress in a work chat room list or a task object list.

The task object database processing part may determine work chat room identification codes for the work chat rooms and a task owner, task assignee, and due date for the task object and store the same in the task object database.

The work progress status processing part may create the work progress status summary information for different phases distinguished by how close the task's due date in the task object is.

The work progress status processing part may create the work progress status summary information for a task object in each stage of a PDCA (Plan-Do-Check-Act) cycle of the work.

The work progress status processing part may supplement the work progress status summary information by identifying whether the status of work progress in the task object is completed status or not.

Once the list of work chat rooms is created through the user interaction, the work processing part may include the work progress status summary information for the task objects of the work chat rooms in the list of work chat rooms.

The work processing part may visualize the work progress status summary information for different phases distinguished by how close the task's due date in the task object is.

Once the list of task objects is created through the user interaction, the work processing part may include the work progress status summary information in the task object list which classifies the task objects by the status of work progress.

The work processing part may include the work progress status summary information in task object list which classifies the task objects by task assignee for each status of work progress.

Once the work chat room is set up through the user interaction, the work processing part may include the work progress status summary information in the status of the work chat room which classifies the task objects by the status of work progress.

The work processing part may visualize a task object message in the message thread of the work chat room if the status of work progress of the task object is completed status.

The work processing part may detect receipt of the user interaction for a particular task object message in the message thread of the work chat room and then includes work progress status summary information for the task object in the task object message status of the particular task object message.

Another exemplary embodiment of the present disclosure provides a work chat room processing method including: a work chat room processing step for processing a plurality of work chat rooms set up for each piece of work, each of the work chat rooms being implemented through a message thread comprised of a task object message designating a task owner and a task assignee and a non-task object message; a task object database processing step for registering a task object in the task object message by work chat room in a task object database; a work progress status processing step for creating work progress status summary information based on current context information by searching the task object database; and a work processing part step for, upon occurrence of a user interaction, provides the current context information to the work progress status processing part, receives the work progress status summary information, and includes the work progress status summary information for each status of work progress in a work chat room list or a task object list.

BRIEF DESCRIPTION OF THE DRAWINGS

FIGS. 9 to 11B are views illustrating a process of providing work progress status summary information according to the present disclosure.

DETAILED DESCRIPTION

Figure 1:
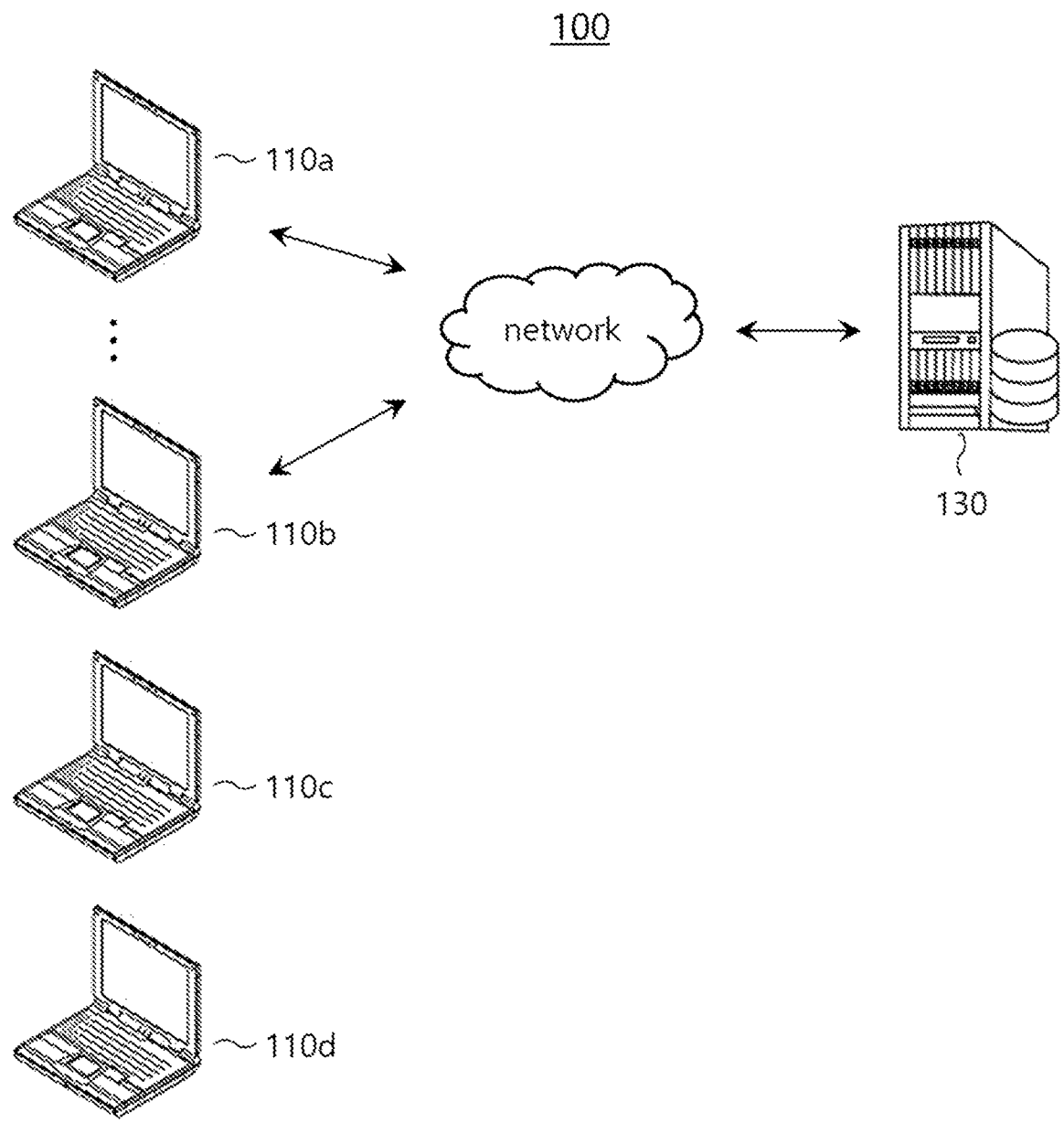
FIG. 1 is a view illustrating a work chat room processing system according to the present disclosure.

The description of the present disclosure is merely an example for structural or functional explanation, and therefore, the scope of the present disclosure should not be construed as being limited by the embodiments described in the text. That is, since the embodiments can be variously embodied and have various forms, the scope of the present disclosure should be understood to include equivalents capable of realizing technical ideas. Also, since the purpose or effect set forth in the present disclosure is not intended imply that to the specific embodiment, the scope of the present disclosure should not be construed as being limited thereto.

Meanwhile, the meaning of the terms described in the present application should be understood as follows.

The terms such as "the first", "the second", and the like, are intended to distinguish one element from another, and the scope of the right should not be limited by these terms.

For example, the first component may be referred to as the second component, and similarly, the second component may also be referred to as the first component.

It is to be understood that when an element is referred to as being "connected" to other element, it may be directly connected to the other element, but there may also be other elements in between. On the other hand, when an element is referred to as being "directly connected" to other element, it should be understood that there is no other element in between. On the other hand, other expressions that describe the relationship between elements, that is, "between~" and "just between~" or "adjacent to~" and "directly adjacent to~" should be interpreted likewise as well.

The singular expressions should be understood to include plural expressions unless the context clearly dictates otherwise. It is also to be understood that the terms "comprise", "include", "have", and the like, are to designate the presence of practiced features, numbers, steps, operations, elements, parts, or combinations thereof, but do not preclude the presence or addition, possibility of one or more other features, numbers, steps, operations, elements, parts, or combinations thereof.

In each step, the identification code (e.g., a, b, c, etc.) is used for convenience of explanation, but the identification code does not describe the order of each step, and unless otherwise explicitly stated, it may occur differently from the stated order. That is, each of steps may occur in the same order as described, may also be performed substantially at the same time, and may be performed in reverse order.

The present disclosure can be embodied as a computer-readable code on a computer-readable recording medium, and the computer-readable recording medium includes all kinds of recording devices for storing data, which can be read by a computer system. Examples of the computer-readable recording medium include ROM, RAM, CD-ROM, magnetic tape, floppy disk, optical data storage device, and the like. In addition, the computer-readable recording medium may be distributed over network-connected computer systems so that computer readable codes can be stored and executed in a distributed manner.

All terms used herein have the same meaning as commonly understood by one of ordinary skill in the art to which this disclosure belongs, unless otherwise defined. Terms defined in commonly used dictionaries should be interpreted to be consistent with meaning in the context of the related art and cannot be interpreted as having ideal or overly formal meaning unless explicitly defined in the present application.

FIG. 1 is a view illustrating a work chat room processing system according to the present disclosure.

Referring to FIG. 1, the work chat room processing system 100 may include one or more user terminals 110 and a work chat room processing apparatus 130.

In an exemplary embodiment of the present disclosure, a plurality of users may be included in one or more user groups. One or more user groups may be referred to as a first user group, a second user group, and so on. One user may be included in one or more user groups.

A first user terminal 110*a* is a terminal of a first user. A second user terminal 110*b* may correspond to a terminal of a second user, a third user terminal 110*c* may correspond to a terminal of a third user, and a fourth user terminal 110*d* may correspond to a terminal of a fourth user.

Here, the first through fourth users may collaborate as participants on one or more pieces of work. The work may include a task with a set deadline or a note object with a set writing interval, that is, a periodic note. Particularly, in the embodiment of the present disclosure, the work may correspond to a task of which the task assignee is required to enter a work result before a due date set as a task deadline by the task owner, or may correspond to periodically writing a note object.

If there is no deadline set for the task, the task assigner or the task owner may enter a deadline for the task. The deadline may be set to a specific date or a period such as two weeks or one month.

According to the embodiment of the present disclosure, individual tasks assigned by the task owner may include writing a note. In the embodiment of the present disclosure, a note that the task assignee creates as assigned by the task owner is referred to as a note object. The note may include text the task assignee enters about the progress of the assigned task or results or details of the assigned task, a file object, a file link, etc.

Moreover, a note object may be periodically entered until the task is closed. Particularly, a note object periodically written in relation to instructions on the task until the task is closed may be referred to as a periodic task.

Moreover, when a note object is required to be periodically written or updated, an interval at which the note object is to be written may be referred to as a note writing interval. For example, for a particular note object, when a periodic note is required to be written once every two weeks, the task assignee has to repeatedly enter a periodic note about the processing or progress of the task. In this case, the note writing interval for a periodic note is two weeks. In addition, a signal or message provided by the work chat room processing apparatus 130 to notify task participants including the task assignee of the arrival or expiration of the deadline whenever the note writing interval is about to end may be referred to as a periodic note reminder.

For this task, one or more of the first through fourth users may be the task owner, and another one or more of them may be the task assignee. Other participants apart from the task owner and the task assignee may be classified as task followers.

For example, the first through fourth users may participate in a common project, and there may be one or more lower-level work items that are included in or subordinate to this project. Big and small pieces of work may be created as lower-level work items in the process of carrying out the project, and, in the embodiment of the present disclosure, they may be referred to as tasks or note objects.

Here, a project or a work item, each task or each note object, and a periodic note may go through a number of phases of work progress which are classified based on their progress or status.

The phases of work progress may include, for example, a normal phase in which a certain amount of time has not passed yet since the start of the task, an approaching phase in which the due date for the task is approaching after the elapse of the certain amount of time, and a delay phase in which the due date for the task has already passed.

For a note object, the phases of work progress may include, for example, a normal phase in which a certain amount of time has not passed yet since the start of a note writing interval, an approaching phase in which the end date of this note writing interval is approaching after the elapse of the certain amount of time, and a delay phase in which the end date of this note writing interval has already passed.

Also, if an update of the note object, such as writing a note for this interval, is done after the note object goes into the approaching phase or the delay phase, the phase of work progress of the note object may go back to the normal phase.

Moreover, the note object may go back to the normal phase when the next note writing interval starts.

For example, the phases of work progress may include "in progress", "under review", "reworking", and "rework completed" according to the PDCA cycle. The PDCA cycle is known as a systematic and efficient work management approach used to improve work performance and outcomes. "P" stands for Plan—that is, setting objectives for a piece of work or a project and establishing concrete strategies and activity plans to realize the objectives. "D" stands for Do—that is, practically performing work on planned items according to rules, guidelines, standards, etc. "C" stands for Check, which means checking work results from the D phase and analyzing and evaluating them to see any differences with the original goals and find parts that need to be improved or reworked. "A" stands for Act, in which necessary measures can be taken for improvement and rework, such as modifying the existing work results or reworking the task to address the problems and opportunities for improvement identified in the previous C phase.

That is, once work instructions are created by the task owner (Plan, P), the task moves into the "in progress" phase. When the task assignee has worked on the task as assigned by the task owner and uploaded a work result of the task (Do, D), the task moves into the "under review" phase.

Moreover, the task owner may review the work result of the task in the "under review" phase (Check, C) and close the task. In this case, the task may move to the "closed" phase. Alternatively, the task owner may ask the task assignee to rework the work result after reviewing it. Once a rework request or a rework instruction is created by the task owner, the task may move to the "reworking" phase.

In a case where the task assignee has reworked the task as instructed by the task owner (Act, A), once the reworked task is uploaded by the task assignee or the uploaded reworked task is confirmed by the task owner, the task may be set to the "rework completed" phase. Also, individual tasks may be classified and arranged according to the phases of work progress.

The work chat room processing apparatus 130 may correspond to a computing device that can be connected to at least one user terminal 110 over a network. In an exemplary embodiment, the work chat room processing apparatus 130 may manage at least one user group in which other users associated with one user are included as team members, i.e., task participants.

In an exemplary embodiment, the work chat room processing apparatus 130 may be connected to a user terminal 110 through a shared folder agent installed on the user terminal 110. Here, the shared folder agent corresponds to an agent program, which is a type of software that, when installed, allows the user terminal 110 and the work chat room processing apparatus 130 to interoperate with the approval of the user terminal 110.

A folder or file to be shared may be, but not limited to, located within a shared folder provided by the work chat room processing apparatus 130. A folder or file to be shared may be located in a shared folder provided by the work chat room processing apparatus 130 or in a personal folder of a file sharer.

The user terminal 110 may correspond to a computing device that may be connected to the work chat room processing apparatus 130 over a network—for example, a terminal that is implemented as a desktop, a laptop, a tablet PC, or a smart phone.

In an exemplary embodiment, at least one of the user terminals 110 may be a mobile terminal and connected to the work chat room processing apparatus 130 via cellular communication or WiFi communication. In another exemplary embodiment, at least one of the user terminals 110 may be a desktop and connected to the work chat room processing apparatus 130 through the internet.

Figure 2:
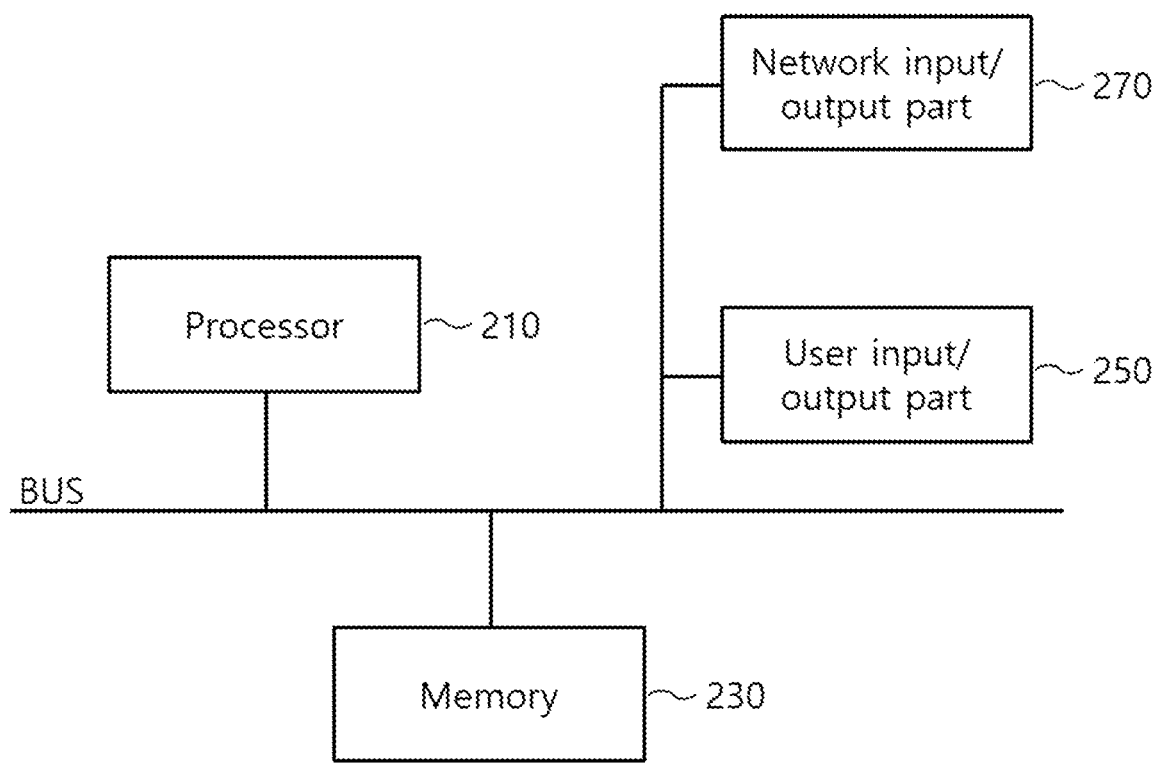
FIG. 2 is a view illustrating a system configuration of the work chat room processing apparatus of FIG. 1.

FIG. 2 is a view illustrating a system configuration of the work chat room processing apparatus of FIG. 1.

Referring to FIG. 2, the work chat room processing apparatus 130 may include a processor 210, a memory 230, a user input/output part 250, and a network input/output part 270.

The processor 210 may execute a work chat room processing procedure according to an exemplary embodiment of the present disclosure, manage the memory 230 from or to which data is read or written during this process, and schedule a time for synchronization between volatile memory and nonvolatile memory in the memory 230.

The processor 210 may control the overall operation of the work chat room processing apparatus 130, and may be electrically connected to the memory 230, the user input/output part 250, and the network input/output part 270 to control the flow of data between them. The processor 210 may be implemented as a central processing unit (CPU) of the work chat room processing apparatus 130. More specific details of the operation of the processor 210 will be described in details later with reference to FIG. 3.

The memory 230 may include auxiliary storage which is implemented as nonvolatile memory such as a solid state disk (SSD) or a hard disk drive (HDD) and used to store all data required for the work chat room processing apparatus 130, and may include primary storage which is implemented as volatile memory such as random access memory (RAM). This way, the memory 230 may be implemented as volatile and nonvolatile memory, and may be connected by a hyperlink if implemented as nonvolatile memory.

The user input/output part 250 may include an environment for receiving user input and an environment for outputting specific information to the user. For example, the user input/output part 250 may include an input device including an adapter such as a mouse, a trackball, a touchpad, a graphics tablet, a scanner, a touchscreen, a keyboard, or a pointing device or connected to that adapter and an output device including an adapter such as a monitor or a touchscreen. In an exemplary embodiment, the user input/output part 250 may correspond to a computing device connected via remote access, in which case the work chat room processing apparatus 130 may serve as a server.

The network input/output part 270 may include an environment for connecting to a user terminal 110 over a network—for example, an adapter for local area network (LAN) communication.

The work chat room processing apparatus 130 may receive a user signal, such as a task display request signal to be described later, through the user input/output part 250 or the network input/output part 270.

Figure 3:
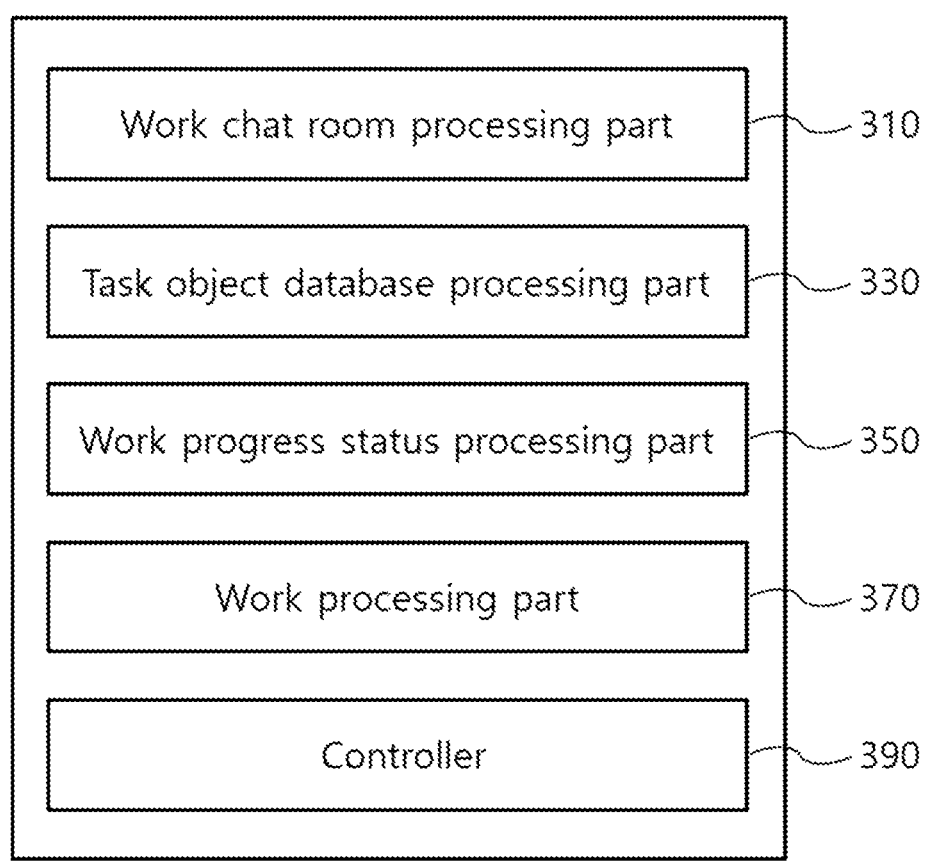
FIG. 3 is a view illustrating a functional configuration of the work chat room processing apparatus of FIG. 1.

FIG. 3 is a view illustrating a functional configuration of the work chat room processing apparatus of FIG. 1.

Referring to FIG. 3, the work chat room processing apparatus 130 may include a work chat room processing part 310, a task object database processing part 330, a work progress status processing part 350, a work processing part 370, and a controller 390.

However, the work chat room processing apparatus 130 according to the exemplary embodiment of the present disclosure does not necessarily include all of the above components, and some of the above components may be omitted depending on each exemplary embodiment and the work chat room processing apparatus 130 may selectively include some or all of the above components.

First of all, the work chat room processing part 310 saves, manages, and updates user information of users participating in a task by receiving user information on one or more users from the user terminal 110 via the user input/output part 250.

Furthermore, the work chat room processing part 310 may create a user group for a collaborative chat room (or work chat room) upon receiving a request from a user to create a user group, and may save and manage information such as names of user groups, criteria for user group classification, team members, information for identification of chat rooms that match different user groups, classifications or divisions of users by group, and information on the management of authorization of users or user groups.

The work chat room processing part 310 may create a work chat room in which some or all of task participants participate, by using user information collected through the above process and user group information created from the user information. The work chat room may be set up for each piece of work and implemented through a message thread. Here, the message thread may be comprised of a task object message designating a task owner and a task assignee and a non-task object message. That is, the work chat room processing part 310 may be implemented in such a way as to process each of a plurality of work chat rooms set up for each piece of work.

Moreover, if a user's user group differs depending on the user's division or position, the work chat room processing part 310 may set identification information of user groups that match their division, department, or position, or, if a user group is designated for each individual user, the work chat room processing part 310 may save information on the designated user group.

When managing task schedules by user or change the due date for a task later, the work chat room processing part 310 may provide or use collected user information.

In the embodiment of the present disclosure, the user may be a task participant including a task assignee who is to work on a task according to work instructions required for the task, a task owner who instructs the task assignee to work on the task, and a task follower associated with other tasks.

The task object database processing part 330 may register a task object in the task object message by work chat room in a task object database. Here, the task object message is a message contained in a message thread, and may correspond to a task message designating a task owner and a task assignee. The non-task object message is a message other than the task object message, and may correspond to a chat message. Thus, a task object derived from the task object message may include a task, a note object with a set interval, etc. Although the example given here shows that the task object is a task, the same applies to when the task object is a note object.

The task object database processing part 330 may detect a task object message in a message thread for each work chat room and create a task object from the task object message and register it in the task object database. The task object database may be a database that only saves and manages task objects.

In addition, the task object database processing part 330 may determine work chat room identification codes for the work chat rooms and a task owner, task assignee, and due date for the task object and store them in the task object database. The task object may be created by including a task owner, a task assignee, and task details, and the work chat room may provide a dedicated interface for creating a task object. The task object database processing part 330 may determine a task owner and a task assignee as information associated with the task object and determine a task due date according to a deadline set for the task object.

For example, if the task object is a note object, information on a note writing interval at which the update or creation of a note object repeats and/or information on a deadline set for each task on which periodic note writing for the note object is finally finished may be stored, along with the task object, in the task object database. Moreover, the task object database processing part 330 may determine an identification code for a work chat room associated with the task object message and register it in the task object database. If it is set to access or open and edit the task object, the task object database processing part 330 may register corresponding information in the task object database as well.

Meanwhile, the identification code for the work chat room is identification information for identifying the work chat room, and may be created uniquely for the work chat room since it reflects information on a creation time, a creator, and participants.

The work progress status processing part 350 may create work progress status summary information based on current context information by searching the task object database. The context information may correspond to status information at the time of receipt of a task display request signal for a particular task object. For example, the context information may include type information of a task object, receipt time information of a task display request signal, a request position, and a response position. The work progress status processing part 350 may create work progress status summary information for a particular task object based on search results from the task object database.

Meanwhile, the work progress status summary information may include statistical information on the status of work progress and settings information on a progress bar and status colors. That is, the work progress status summary information may be created by including status information for each phase of work progress of a task object and visualized information.

Here, the progress bar is a widget that displays the amount of progress of a period or a particular process or shows the user that the process is in progress. Accordingly, a progress bar according to the embodiment of the present disclosure visualizes how many days and hours have passed since a task associated with one task object started according to a preset schedule and how many days and hours are left until a task deadline, i.e., due date.

A task progress bar corresponds to a progress bar showing a schedule for a task, and may be created and renewed for each task. The start date (task start date) and end date (task deadline) of a task schedule for a particular task may correspond to the start and end points of its task progress bar.

That is, the task progress bar visualizes the passage of time for each task, i.e., how many days and hours have passed until the present over an entire timeline from the start of a particular task to the due date of the task. Specifically, the task progress bar shows in real time through the position of a scrollbar, how many days and hours have passed until the present from the task start date, and the position of the scrollbar is continuously updated from the present time and may be renewed each time a new task is created or the task is reset. The work progress status processing part 350 may include the task progress bar in the work progress status summary information.

Moreover, the work progress status processing part 350 may create the work progress status summary information for different phases distinguished by how close the task's due date in the task object is. More specifically, the work progress status processing part 350 may set two or more different phases of work progress of a task depending on whether the task's deadline is approaching or has passed. The work progress status processing part 350 may set phases of work progress of each task, according to work instructions and rework instructions entered from the user terminal 110 or according to a work schedule, rework schedule, or periodic note writing schedule corresponding to these instructions.

For example, once a task associated with a task object is started, the work progress status processing part 350 may set the phase of work progress of the task to Normal and then change the phase of work progress to Approaching after a preset period of time. Also, once a due date calculated based on the task's deadline has passed, the work progress status processing part 350 may change the phase of work progress to Delay.

In addition, the work progress status processing part 350 may display the task in a color corresponding to the phase of work progress set for the task when presenting the task on the display of the user terminal 110. Alternatively, the work progress status processing part 350 may display different tasks visually differently for each phase of work progress by displaying the tasks in different colors, sizes, brightnesses, background colors, edge colors, fonts, shades, depths, flickers, and so on according to the phase of work progress of each task.

For example, the work progress status processing part 350 may set colors for each phase of work progress when setting phases of work progress for a task associated with a task object, and may select how to display the task, such as in a color corresponding to the current phase of work progress of the task, and present the task on the user's display accordingly.

Also, these different ways of display, such as using different colors, may always apply when the task object is displayed. When the user terminal 110 accesses the task object database via a cloud, an intranet, a shared folder, etc., the work progress status processing part 350 may display each task in a color corresponding to their phase of work progress and create it as work progress status summary information, and the work chat room processing apparatus 130 may provide the work progress status summary information along with a list of tasks.

Displaying a task in different ways according to the phase of work progress may involve displaying an icon, task name, file name, and document name corresponding to the task, a message for forwarding or sharing the task, a notification box, a reminder associated with the task, and so on in different ways corresponding to the phase of work progress. Also, the different ways of display may include applying different colors, sizes, brightnesses, background colors, edge colors, fonts, shades, depths, flickers, and so on to an icon, a task name, a file name, etc.

Likewise, when the user shares or forwards a particular task object message through a work chat room, the work chat room processing apparatus 130 may display an icon or the like corresponding to the task in a color corresponding to the phase of work progress.

Besides, when the user attaches and sends a particular task through email, the work chat room processing apparatus 130 may display an icon, file name, etc. corresponding to the task in a color corresponding to the phase of work progress.

Further, when the user uploads the task onto a web page accessible by task participants or the like, the work chat room processing apparatus 130 may display an icon, file name, thumbnail, etc. corresponding to the task in a color corresponding to the phase of work progress.

According to the embodiment of the present disclosure, the work chat room processing apparatus 130 may always display a task in a color corresponding to the phase of work progress when displaying the task via various channels or presenting the task in order for the user to view.

While the example given here is mainly about color, the method of displaying a task in different ways according to the phase of work progress is not limited to changing colors or applying different colors, and various embodiments may be applied as explained above, such as different sizes, brightnesses, background colors, edge colors, fonts, shades, depths, flickers, and so on.

Moreover, the work progress status processing part 350 may create the work progress status summary information for a task object in each stage of a PDCA (Plan-Do-Check-Act) cycle of the work. The work progress status processing part 350 may create a single piece of work progress status summary information for all task objects present in a work project as a basic unit, or may classify the task objects according to the PDCA cycle of the work and then create multiple pieces of work progress status summary information individually for the task objects for each phase of work progress.

For example, if a piece of work corresponds to a task, the status of work progress may include "new", "doing", "done", and "confirmed". "New" represents a state in which a task is created, and is displayed in black. "Doing" is displayed in blue if there is plenty of time until the deadline for the task, yellow if three days or less are left until the deadline for the task, and red if the deadline for the task has passed. "Done" represents a state in which the task assignee has pressed a "done" button and is waiting for confirmation, and is outlined in red. "Confirmed" represents a state in which the task has been confirmed as completed, and may be displayed in black.

In addition, if a piece of work includes a predetermined plan such as a periodic note, the status of work progress may include "scheduled", "in progress", "overdue", and "confirmed". "Scheduled" is a state in which the start date of the plan has not come yet, and is displayed in black. "In progress" is displayed in blue if there is plenty of time until the next date for note writing, yellow if three days or less are left until the next date for note writing, and red if the next date for note writing has passed. "Overdue" represents a state in which the plan needs to be evaluated since a given period of time has passed, and is outlined in red. "Confirmed" represents a state in which the plan has been confirmed as completed, and may be displayed in black.

Further, the work progress status processing part 350 may supplement the work progress status summary information by identifying whether the status of work progress in the task object is completed status or not. Here, the status of work progress may correspond to the phase of work progress. For example, the status of work progress of a plan may include: "scheduled", "in progress", "overdue", and "confirmed", and the status of work progress of a task may include "new", "doing", "done", and "confirmed". Basically, the work progress status summary information may correspond to status information for the statuses other than "confirmed" which corresponds to completed state in the course of work progress. Upon detecting that the status of work progress is completed status, the work progress status summary processing part 350 may renew the work progress status summary information by adding the detected information to it.

Upon occurrence of a user interaction, the work processing part 370 may provide the current context information to the work progress status processing part 350, receive the work progress status summary information, and include the work progress status summary information for each status of work progress in a work chat room list or a task object list. Here, the work chat room list may correspond to a list of work chat rooms associated with a particular work project, and the task object list may correspond to a list of task objects associated with a particular work chat room. The work processing part 370 may determine context information associated with information to be provided to the user in response to a user interaction including the user's login, the user's selection or entry, etc., and transmit the context information to the work progress status processing part 350 and receive work progress status summary information. The work processing part 370 may include work progress status summary information for each work chat room in the list of work chat rooms or for each task object in the list of task objects.

Moreover, once the list of work chat rooms is created through the user interaction, the work processing part 370 may include the work progress status summary information for the task objects of the work chat rooms in the list of work chat rooms. Also, the work processing part 370 may visualize the work progress status summary information for different phases distinguished by how close the task's due date in the task object is. For example, the number of task objects may be displayed in different colors (or state colors) according to the status of work progress for each work chat room displayed in the list of work chat rooms. This will be described in more details with reference to FIG. 9.

In addition, once the list of task objects is created through the user interaction, the work processing part 370 may include the work progress status summary information in the task object list which classify the task objects by the status of work progress. For example, a separate list of task objects may be provided for each status of work progress through an Act tab for task object lists. In this case, work progress status summary information for each status of work progress may be displayed at the top of the list of task objects. Also, the work processing part 370 may include the work progress status summary information in the task object list which classify the task objects by task assignee for each status of work progress. For example, a separate list of task objects may be provided for each status of work progress through an Act tab for task object lists, and work progress status summary information for each task assignee may be displayed in the list of task objects for each status of work progress. This will be described in more details with reference to FIGS. 10A and 10B.

Further, once the work chat room is set up through the user interaction, the work processing part 370 may include the work progress status summary information in the status of the work chat room which classifies the task objects by the status of work progress. The user may enter the work chat room through a user interaction of selecting a particular chat room from the list of work chat rooms, and once the work chat room is opened, the work processing part 370 may sequentially display messages in a message thread associated with the work chat room. In this case, work progress status summary information on task objects associated with the work chat room may be displayed as well, at the top of the work chat room so as to quickly see the overall progress of work. That is, the status of the work chat room may correspond to summary information that shows the task objects associated with the work chat room by classifying them by the status of work progress.

Further, the work processing part 370 may visualize a task object message in the message thread of the work chat room if the status of work progress of the task object is completed status. That is, when a work chat room is opened, the work processing part 370 may sequentially display the messages in the message thread, and the messages may be classified as task object messages and non-task object messages according to their association with task objects. For the task object messages, if their status of work progress is completed status, it means that confirmation is required for closure, and therefore the task object message may be visually highlighted to stand out from the other messages. For example, a task object message in completed status may be displayed in the form of a message highlighted with a red outline and in red text within the work chat room. However, if the task object message is displayed only with a red outline but not in red text, it may correspond to a message for delayed work.

Meanwhile, the work processing part 370 may visualize a task object message for each status of work progress to display it within the work chat room. That is, a task object message may be highlighted in different colors according to the status of work progress.

Further, the work processing part 370 may detect receipt of the user interaction for a particular task object message in the message thread of the work chat room and then include work progress status summary information for the task object in the task object message status of the particular task object message. The user may select a task object message displayed within the work chat room as a way of user interaction, and work progress status summary information for the selected task object message may be displayed in a specific area of the task object message.

The controller 390 may control the overall operation of the work chat room processing apparatus 130, and manage the control flow or data flow among the work chat room processing part 310, the task object database processing part 330, the work progress status processing part 350, and the work processing part 370.

Figure 4:
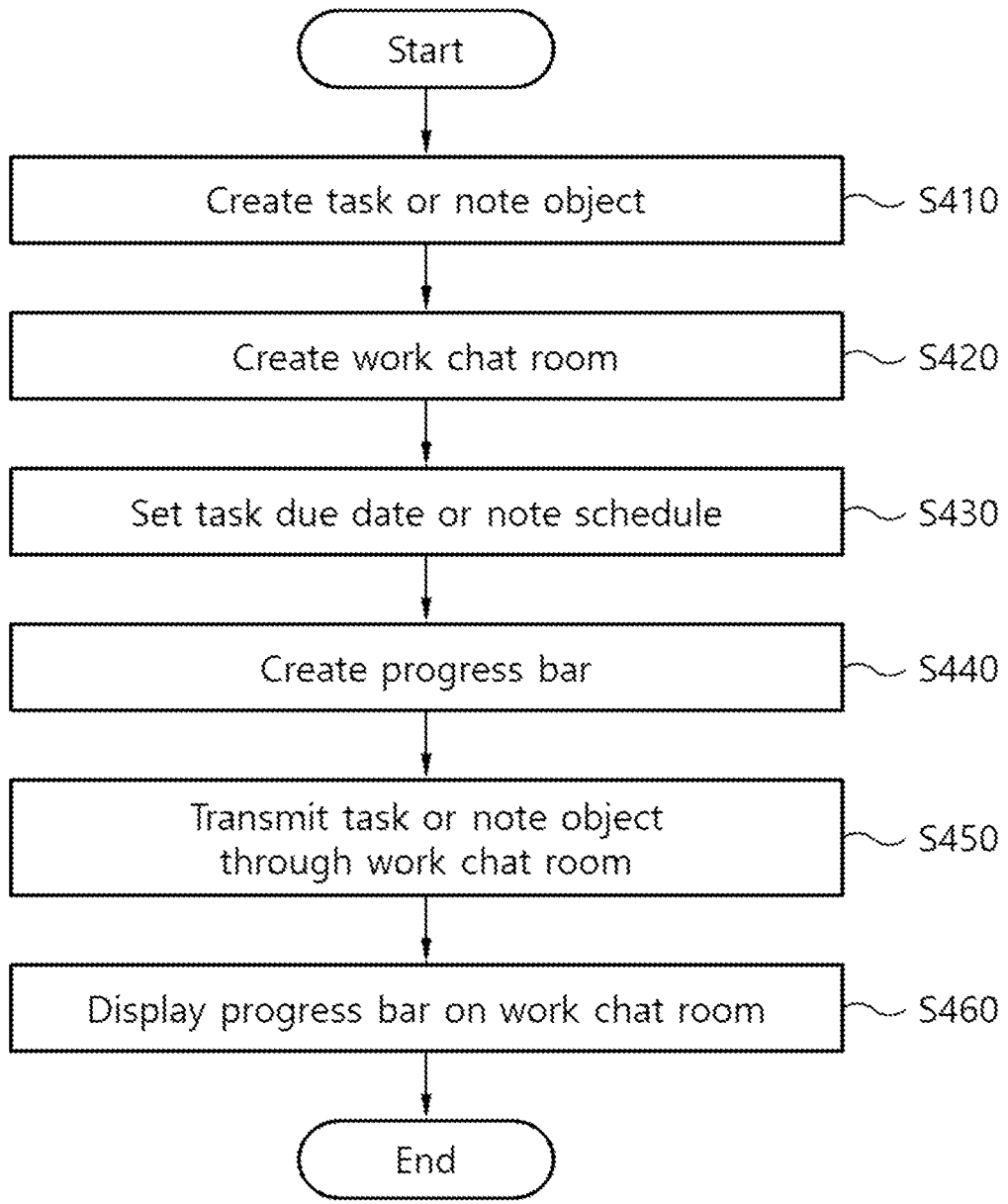
FIG. 4 is a flowchart of a work chat room processing method according to the present disclosure.

FIG. 4 is a flowchart of a work chat room processing method according to the present disclosure.

Referring to FIG. 4, a piece of work may be a task or a note object. That is, processing a task may involve creating and writing a note object associated with the task. The note object may include text, a file object, a file link, etc. a task assignee enters about the progress or details of the task. The note object may be periodically written until the task is fully terminated. A note to be periodically written in relation to the task until the termination of the task may be referred to as a periodic note.

As above, when a note object to be written in relation to the task is required to be periodically entered, an interval at which a periodic note is to be written may be referred to as a note writing interval. For example, for a specific task, when the task owner requires a periodic note to be written once every two weeks, the task assignee has to enter a periodic note about the processing or progress of the task once every two weeks since the start of the task. In this case, the note writing interval for a periodic note is two weeks.

Here, the updating of a note object may be one or more of the following: creating a new note object, adding a note object, altering or editing the content or settings of a note object, adding a file object associated with a note object, and entering a user signal associated with a note object.

First of all, the work chat room processing apparatus 130 may create a task or a note object in response to a request from a task owner or a task assignee (S410). The work chat room processing apparatus 130 may receive task-related materials, work instructions, and information on task participants from the user terminal 110 to create a task or a note object. In this case, if the note object is a periodic note, information on the note writing interval may be entered as well.

Moreover, the work chat room processing apparatus 130 may create a work chat room (S420). The work chat room is a chat room that the task owner, the task assignee, etc. join. Here, the creation (S410) of a task or a note object does not always precede the creation (S420) of a work chat room, these steps may be done in reverse order. Particularly, a work chat room may be created first, and then a task or a note object may be created via a user interface provided through the work chat room.

The work chat room processing apparatus 130 may set a task due date, a note writing interval, and/or a periodic note update deadline for the note writing interval based on task schedule information for the task received from the user (S430). The work chat room processing apparatus 130 may find out or set the due date for the task, the periodic note update deadline, and so on based on task schedule information set for the task.

For example, if a user who has requested the creation of a task enters a date when the task is due, this date may be set as the due date for the task. Alternatively, if a specific time and date are designated and saved as the start date of the task and the duration for the task is entered, the work chat room processing apparatus 130 may calculate and set the due date for the task. For example, if the start date of the task is Jan. 1, 2021 and the deadline for the task is two weeks away, the due date for the task may be set to January 15.

In another example, if a user who has requested the creation of a note object enters a date when the note writing for the note object is finished, this date may be set as the due date for updating the note object. Alternatively, if a specific time and date are designated and saved as the start date of the note writing interval for the note object and the note writing interval for the note object is entered, the work chat room processing apparatus 130 may derive the periodic note update deadline for the current note writing interval, and set the due date accordingly.

For example, if the start date of a first note writing interval for the note object is Jan. 1, 2021 and the note writing interval is two weeks, a first periodic note update deadline for the note object may be set to January 14. If the periodic note update for the first interval of the note object is done within the deadline, a second note writing interval may start on January 1 or on the day following the completion of the first periodic note update according to embodiments.

The work chat room processing apparatus 130 may create a task progress bar by using a task schedule—that is, deadline information such as the start date of a task and the due date for the task. Also, the work chat room processing apparatus 130 may create a note interval progress bar by using a task schedule for the note object—that is, task schedule information or deadline information, such as the start date of a note interval when the note object is started, the end date of the note object when the note object is completely ended, the start date and end date of each note writing interval, and the periodic note update deadline for each interval (S440).

The start and end points of the progress bar are the start date of the task when the task is started and the due date of the task when the task needs to be completed, respectively, based on the deadline information or task schedule information for the task or the note object. Also, the progress bar may show by using a scrollbar or the like, how many days and hours have passed until the present from the task start date and how many days and hours are left until the task due date from the present. Also, the progress bar may show the remaining days and hours until the task due date (or the end date of the note writing interval).

Afterwards, if a task display request signal is received from the task owner or the task assignee or one or more participants in the work chat room transmit a task or a note object through the work chat room, the work chat room processing apparatus 130 may provide the task or the note object through the work chat room (S450).

Here, the task display request signal may be a user signal the user sends to the work chat room processing apparatus 130 that requests to display a particular task so that they are able to view or access it. Also, the user may request one or more tasks through the task display request signal. That is, the user may request to view multiple tasks and/or periodic notes by sending the task display request signal through the work chat room.

Moreover, the task display request signal may be entered in various occasions where an icon or image corresponding to the task is displayed, such as when viewing a list containing the corresponding task or note object, accessing to open a file for the corresponding task or note object, sharing or forwarding the corresponding task or note object through the chat room, and retrieving the corresponding task or note object to attach it to an email.

In addition, along with a task or note object, the work chat room processing apparatus 1340 may display a progress bar for the corresponding task or note object on the work chat room (S460).

Figure 5:
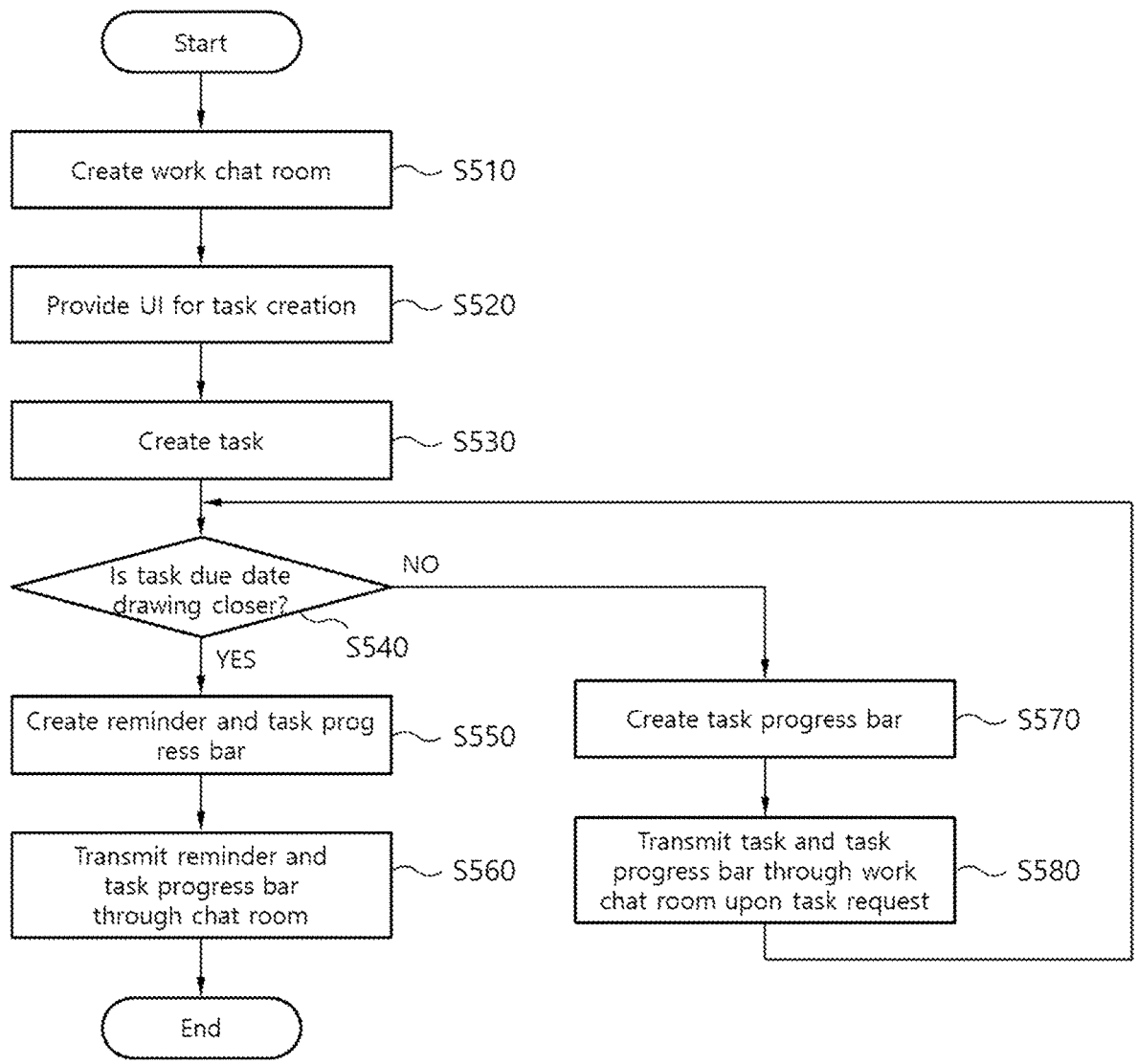
FIG. 5 is a flowchart of a work chat room processing method according to an embodiment of the present disclosure.

FIG. 5 is a flowchart of a work chat room processing method according to an embodiment of the present disclosure.

Referring to FIG. 5, the work chat room processing apparatus 130 may create a work chat room that task participants can join, by using information on the task participants (S510). The work chat room processing apparatus 130 may provide a user interface UI for creating tasks through the work chat room (S520).

Afterwards, the work chat room processing apparatus 130 may receive work instruction details and information on a task owner, a task assignee, a task deadline, etc. via the user interface in order to create a task, and the user may upload or download file objects or materials required for creating and proceeding with a task via the user interface. The work chat room processing apparatus 130 may create a task by using received information, signals, and materials (S530).

A due date for the task will be drawing closer as time passes after the creation of the task. Here, the criteria as to whether the due date is drawing closer or not may be set by the user or by the default settings within the work chat room processing apparatus 130. For example, with the task's due date only one week or three days away, the work chat room processing apparatus 130 may determine that the due date for the task is drawing closer.

The work chat room processing apparatus 130 may determine whether the task's due date is drawing closer at this point in time (S540), and, if the task's due date is drawing closer, may create a reminder and a task progress bar (S550). Also, the work chat room processing apparatus 130 may transmit the created reminder and/or task progress bar through the work chat room (S560). In this case, if this reminder is a reminder that notifies that the task's due date is drawing closer, it may be called a task due date reminder.

If the task's due date is drawing closer, the work chat room processing apparatus 130 may provide a task due date reminder to the task assignee through the work chat room. In this case, the task due date reminder may be sent as a type of chat message within the work chat room.

Also, when providing a task due date reminder through the work chat room as the due date is drawing closer, the work chat room processing apparatus 130 may provide a task progress bar at the time of issuing the task due date reminder, along with the task due date reminder.

Such a task reminder is not always transmitted through the work chat room alone, but may be transmitted to the user terminal 110 of the task assignee or the like in the form of a push notification without through the work chat room. In this case, a push notification that the task's due date is drawing closer may be called a task due date push notification.

The task due date push notification may include either or both of the remaining days until the task's due date and information on the total number of task due date reminders sent, if a reminder or push notification has been repeatedly sent.

If a certain amount of time has passed since the start of the task but there is still some time until the task's due date, the work chat room processing apparatus 130 may create a task progress bar, and provide the task and the task progress bar through the work chat room upon a request to send the task from one or more task participants through the work chat room (S570 and S580).

Meanwhile, the work chat room processing apparatus 130 may provide a task participant with a list of one or more tasks the task participant is involved in or has access to. Such task list information includes the names of one or more tasks. When displaying a task list, the work chat room processing apparatus 130 may display information on the deadline or schedule for the task as well by matching it with each task.

In this case, for example, the remaining days until the due date for each task may be displayed along with the task name on the task list. That is, when displaying the task list, the work chat room processing apparatus 130 may provide either or both of the remaining days until the due date for each task and the total number of task due date reminders, along with the task list information.

If the task's due date has passed according to the task deadline information but an assignment be completed by the task assignee until the task's due date has not been completed, the work chat room processing apparatus 130 may issue a task due date reminder to the terminal of the task assignee. Moreover, the work chat room processing apparatus 130 may repeatedly send a task due date reminder since the task's due date until the assignment given in the task is completed.

Also, the task or the task progress bar may show different phases of work progress.

Also, the work chat room processing apparatus 130 may get current schedule information of the task and the corresponding phases of work progress of the task before displaying the task in response to a task display request signal. The phases of work progress of the task may be classified, for example, into Normal, Approaching, and Delay.

Over a period of time from the start of a piece of work until a work result is entered, the phases of work progress of the task may include a normal phase in which a preset amount of time has not passed yet since the start date, an approaching phase in which the due date is approaching after the elapse of the preset amount of time, and a delay phase in which the due date has passed.

Accordingly, if the assignment given in the task has been done yet, the phases of work progress of the task progress bar may include a normal phase in which a preset amount of time has not passed yet since the start date of the task and no task due date reminder has been issued, an approaching phase which spans from the issuing of a first task due date reminder to the task's due date, and a delay phase in which the task's due date has passed. When the assignment given in the task is completed, the approaching phase or the delay phase may be lifted.

If the task progress bar is in the normal phase or the approaching phase, the work chat room processing apparatus 130 may display the remaining days until the task's due date on the task progress bar, along with status information. If the task progress bar is in the approaching phase or the delay phase, the work chat room processing apparatus 130 may display the total number of task due date reminders sent on the task progress bar, along with status information. Accordingly, in the approaching phase, the remaining days until the due date and the total number of reminders repeatedly sent may be displayed together on the task progress bar.

According to the embodiment of the present disclosure, a task (or a note object) is displayed along with a task progress bar (or note interval progress bar) for the task, when the task (or note object) is displayed through an email or the like, as well as a chat room the task owner and at least one task assignee are joining.

Also, a task due date reminder associated with the task may be displayed along with the task progress bar. Here, the task due date reminder to be sent may include either or both of the remaining days and hours until the task deadline or due date and information on how many days and hours have passed since the task deadline.

Therefore, especially when multiple tasks are displayed, the user is able to see the progress and imminence of each task and whether each task is delayed or not, by using information visualized through a progress bar, and intuitively see the degree of urgency or priorities of multiple tasks and recognize the schedule and progress of each task at a glance.

Figure 6:
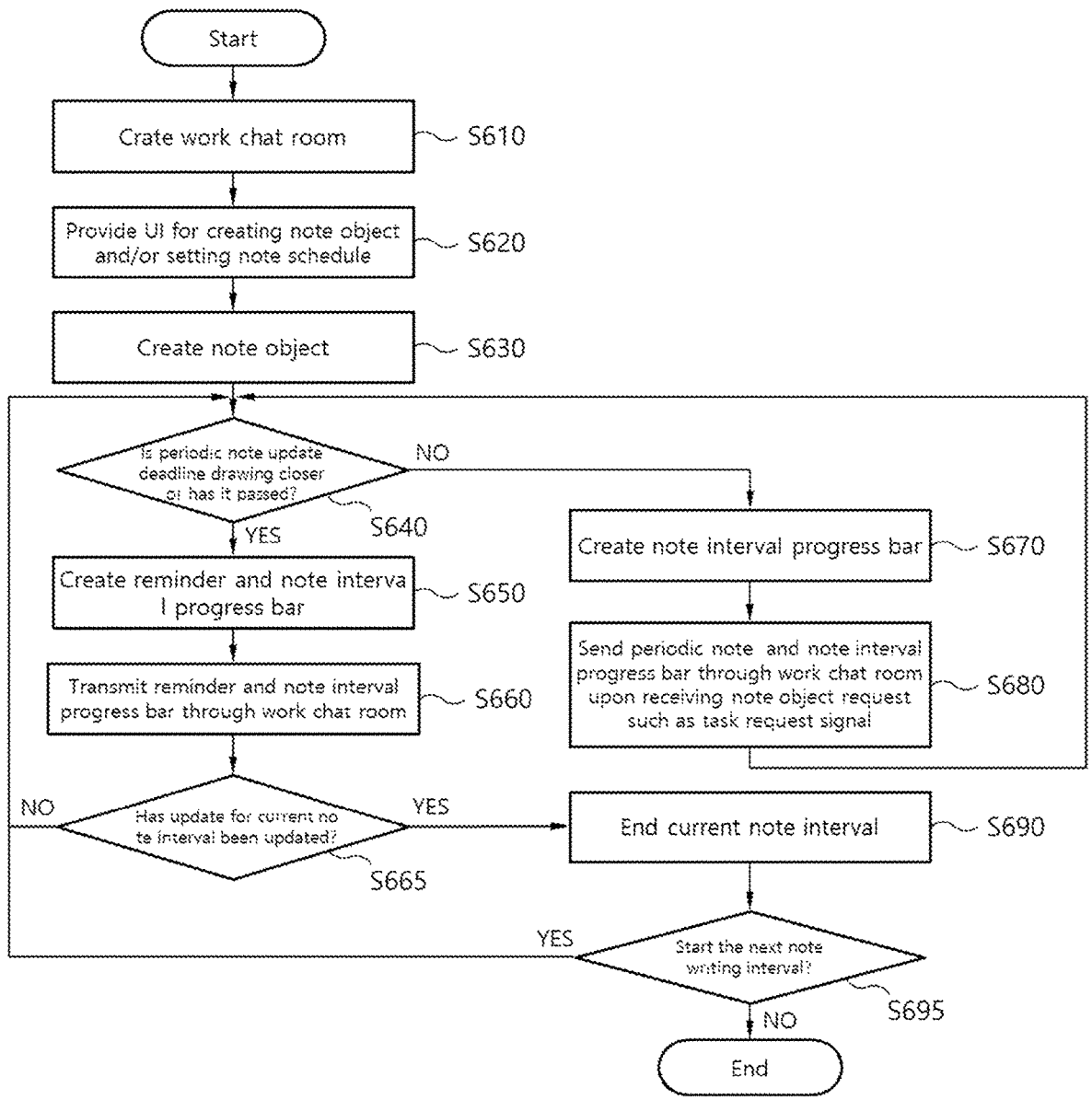
FIG. 6 is a flowchart of a work chat room processing method according to another embodiment of the present disclosure.

FIG. 6 is a flowchart of a work chat room processing method according to another embodiment of the present disclosure.

Referring to FIG. 6, the work chat room processing apparatus 130 may create a work chat room (S610). The work chat room processing apparatus 130 may provide a user interface for creating a note object and/or setting a task schedule related to the note object through the work chat room (S620). The work chat room processing apparatus 130 may create a note object by using information, signals, and materials received through the user interface (S630).

A periodic note update deadline for the current note writing interval will be drawing closer as time passes after the creation of the note object. The work chat room processing apparatus 130 may determine whether the periodic note update deadline is drawing closer at this point in time (S640), and, if it is determined that the periodic note update deadline is drawing closer, may create a reminder and a note interval progress bar (S650). The reminder may be a note interval reminder.

Also, the work chat room processing apparatus 130 may transmit the created reminder and/or the note interval progress bar to the task owner or the like through the work chat room (S660). In this case, the reminder may be sent as a type of chat message within the work chat room.

After the reminder is transmitted, the work chat room processing apparatus 130 may check whether the update for the current note interval has been done within the deadline (S665), and, if the update has been done, may end the current note writing interval (S690). In some embodiments, once the periodic note update has been done, the note writing interval may be ended even before the end date of the note writing interval. Alternatively, in other embodiments, even if the periodic note update has been done before the end date of the note writing interval, the current note writing interval may be ended and the next note writing interval may start, only after the end date of the note writing interval after the elapse of a period of time initially set for the note writing interval. If the periodic note update for the current note writing interval has not been done (S665), it may be re-determined whether the deadline or end date is drawing closer or has passed and then the steps S640 to S660 of providing a reminder or the like may be repeated.

The work chat room processing part 130 determines whether the next note writing interval will be started or not, when the current note writing interval has ended but the complete end date of the note object has not come yet (S695). If there is a next note writing interval to be started, the work chat room processing apparatus 130 may re-determine whether the periodic note update deadline is drawing closer or not. On the other hand, if there is no note writing interval to be started any more, that is, the complete end date of the note object has come, the process may be ended.

The work chat room processing apparatus 130 determines whether the current periodic note update deadline is drawing closer at this point in time (S640), and, if it is determined that the periodic note update deadline is not drawing closer, may create a note writing progress bar (S670). Afterwards, upon receiving a note object request from the user terminal 110, such as a task request signal or the like, the work chat room processing apparatus 130 may send both the note object and the note interval progress bar through the work chat room (S680). Afterwards, the work chat room processing apparatus 130 re-determines whether the period note update deadline is drawing closer with the passage of time (S640).

Also, when the work chat room processing apparatus 130 provides the note object or provides the note interval reminder through the work chat room as the end date is drawing closer, the note interval progress bar may be updated as of the present time.

Such a reminder is not always transmitted through the work chat room alone, but may be transmitted to the user terminal 110 of the task assignee or the like in the form of a push notification without through the work chat room. In this case, a push notification that the periodic note update deadline is drawing closer may be called a periodic interval push notification.

The periodic interval push notification may include either or both of the remaining days until the end date of the current note writing interval and information on the total number of reminders or push notifications sent if a reminder or push notification has been repeatedly sent.

Meanwhile, the work chat room processing apparatus 130 may provide a task participant with a list of one or more note objects the task participant is involved in or has access to. Such note object list information includes the names of one or more note objects. When displaying a note object list, the work chat room processing apparatus 130 may display information on the deadline or schedule for the note object as well by matching it with each note object.

In this case, for example, the remaining days until the periodic note update deadline for each note object task may be displayed along with the note object name on the note object list. That is, when displaying the note object list, the work chat room processing apparatus 130 may provide either or both of the remaining days until the end date of the current note writing interval for each note object and the total number of note interval end reminders, along with the note object list information.

If the periodic note update deadline has passed according to the note writing interval for the note object but an assignment to be completed by the task assignee until the deadline has not been completed, the work chat room processing apparatus 130 may issue a note interval end reminder to the terminal of the task assignee. Moreover, the work chat room processing apparatus 130 may repeatedly send a note interval end reminder since the periodic note update deadline until the assignment given in the note object is completed.

Also, the note object or the note interval progress bar may have different phases of work progress. Also, the work chat room processing apparatus 130 may get current schedule information of the note object and the corresponding phases of work progress of the note object before displaying the note object in response to a note object display request signal. The phases of work progress of the note object may be classified, for example, into Normal, Approaching, and Delay.

Over a period of time from the start of a piece of work until a work result is entered, the phases of work progress of the note object may include a normal phase in which a preset amount of time has not passed yet since the start date, an approaching phase in which the due date is approaching after the elapse of the preset amount of time, and a delay phase in which the due date has passed. The note interval progress bar has the same phases of work progress as the note object.

Accordingly, if the assignment given in the task has been done yet, the phases of work progress of the note interval progress bar may include a normal phase in which a preset amount of time has not passed yet since the start date of the note writing interval and no note interval end reminder has been issued, an approaching phase which spans from the issuing of a first note interval end reminder to the end date of the note writing interval, and a delay phase in which the end date of the note writing interval has passed. When the assignment given in the task is completed, the approaching phase or the delay phase may be lifted.

If the note interval progress bar is in the normal phase or the approaching phase, the work chat room processing apparatus 130 may display the remaining days until the periodic note update deadline on the note interval progress bar, along with status information. If the note interval progress bar is in the approaching phase or the delay phase, the work chat room processing apparatus 130 may display the total number of note interval end reminders sent on the note interval progress bar, along with status information. Accordingly, in the approaching phase, the remaining days until the deadline and the total number of reminders repeatedly sent may be displayed together on the note interval progress bar.

Figure 7A:
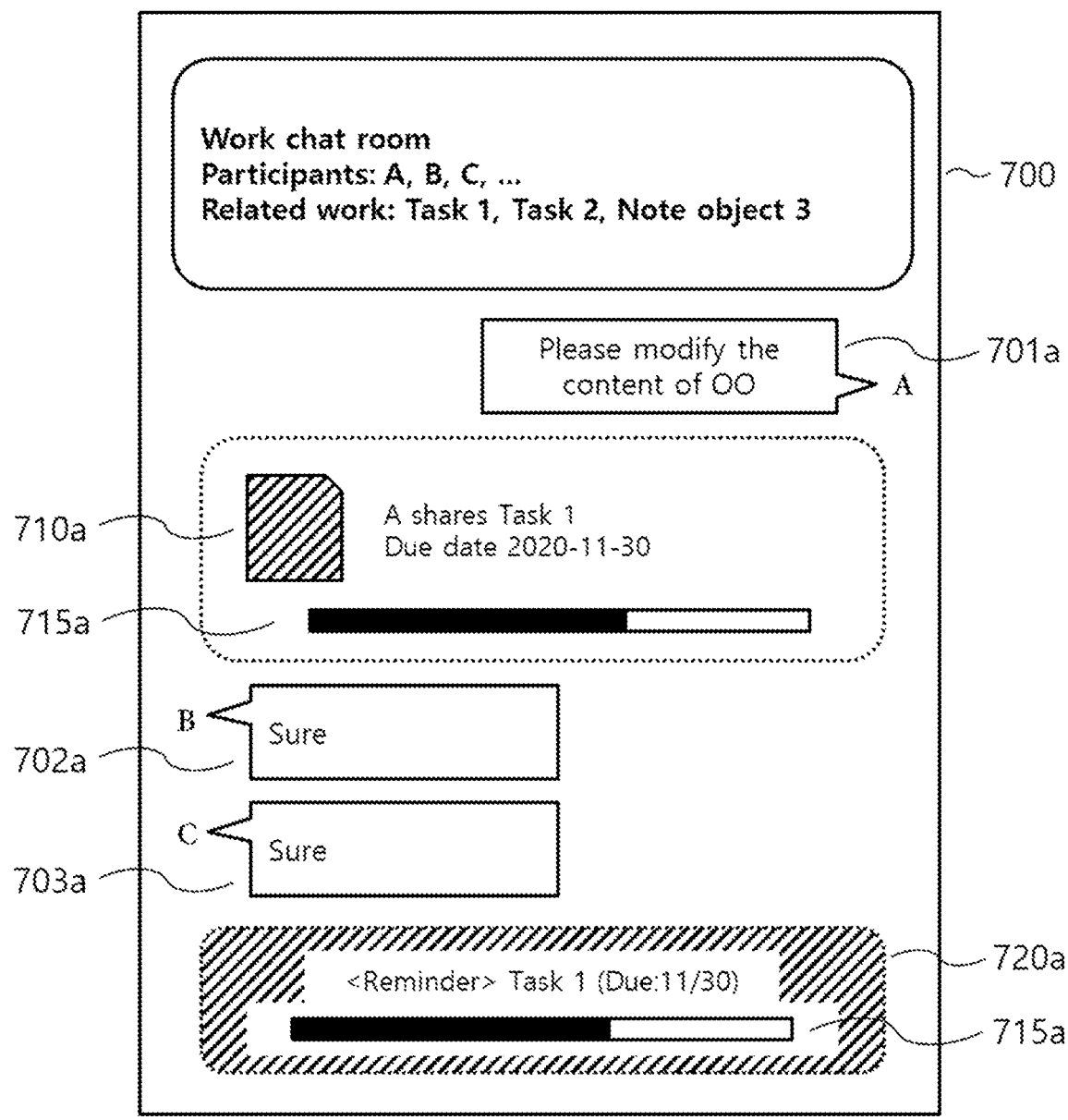
FIGS. 7A and 7B are views illustrating a work chat room according to an embodiment of the present disclosure.
Figure 7B:
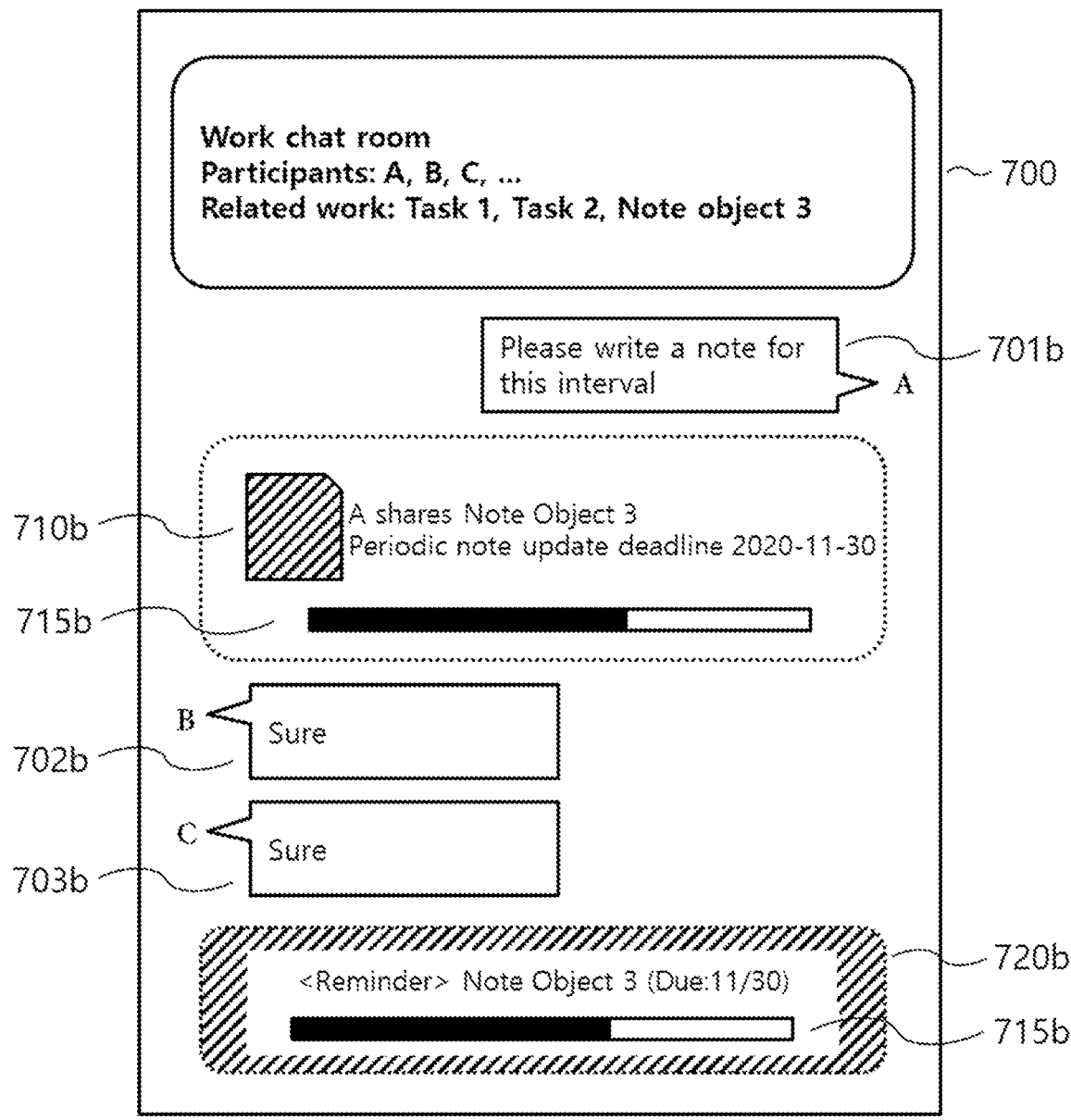

FIGS. 7A and 7B are views illustrating a work chat room according to an embodiment of the present disclosure.

FIGS. 7A and 7B depict part of a work chat room 700 where users associated with task objects, that is, task participants such as a task owner and a task assignee, can join according to an embodiment of the present disclosure. In the embodiment explained with reference to FIG. 7A, the task objects associated with the work chat room 700 may be Task 1, Task 2, and Note Object 3, for example. Also, User A may be a task owner, and User B and User C may be task assignees.

Chat messages 701*a*, 702*a*, and 703*a* may be sent through the work chat room 700, and a task object such as a task or a note object may be shared or a file object associated with the task object may be transmitted.

If User A shares Task 1 through the work chat room 700, Icon 1 710*a* corresponding to Task 1 may be displayed through a chat box in the work chat room 700. In this instance, a task progress bar 715*a* corresponding to Task 1 may be displayed through the work chat room 700 along with Task 1.

Moreover, as the phase of work progress goes to the approaching phase after the elapse of a certain amount of time since the start of Task 1, a task due date reminder 720*a* for this may be transmitted through the work chat room 700. When the task due date reminder 720*a* is displayed, the task progress bar 715*a* for the task object associated with the task due date reminder 720*a*, i.e., Task 1, may be displayed along with the task due date reminder 720*a*.

Referring to FIG. 7B, if User A shares Note Object 3 through the work chat room 700, Icon 1 710*b* corresponding to Note Object 3 may be displayed through a chat box in the work chat room 700. In this instance, a note interval progress bar 715*b* corresponding to Note Object 3 may be displayed through the work chat room 700 along with Note Object 3.

Moreover, as the phase of work progress of Note Object 3 goes to the approaching phase after the elapse of a certain amount of time since the start of Note Object 3, a note interval reminder 720*b* for this may be transmitted through the work chat room 700. When the note interval reminder 720*b* is displayed, the note interval progress bar 715*b* for the task object associated with the note interval reminder 720*b*, i.e., Note Object 3, may be displayed along with the note interval reminder 720*b*.

Figure 8:
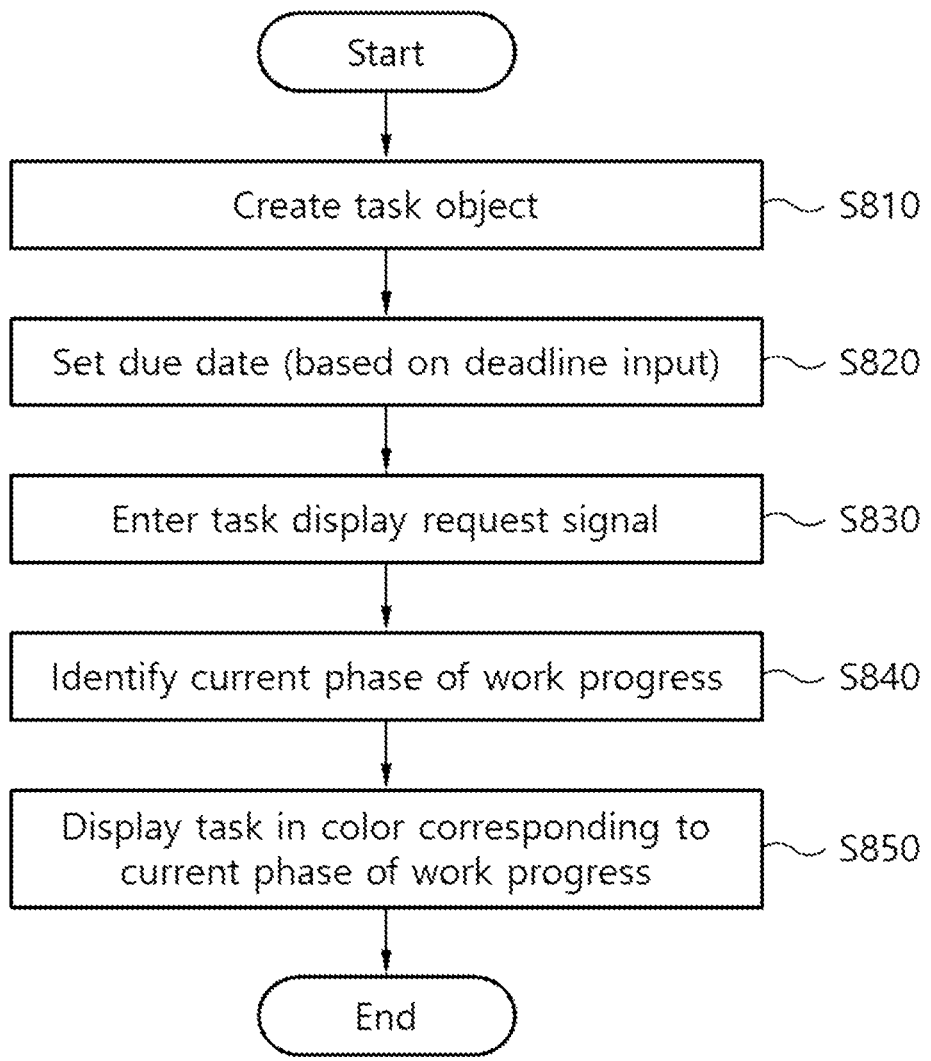
FIG. 8 is a flowchart of a work chat room processing method according to yet another embodiment of the present disclosure.

FIG. 8 is a flowchart of a work chat room processing method according to yet another embodiment of the present disclosure.

Referring to FIG. 8, the work chat room processing apparatus 130 may display and present a task object in a color set by a user who has entered a task display request signal and/or according to the phase of work progress of the task object.

First of all, the work chat room processing apparatus 130 may create a task object in response to a request from a task owner or a task assignee (S810). Here, the task object may be a task with a set deadline or a note object which requires periodic writing.

It should be noted that, in the embodiment explained with reference to FIG. 8, the task object is a task of which the task assignee is required to enter a work result before a due date set as a task deadline by the task owner, which is, in this case, a one-time task. If there is no deadline set for the task, the task assigner or the task owner may enter a deadline for the task. The deadline may be set to a specific date or a period such as two weeks or one month.

The work chat room processing apparatus 130 may find out or set the due date for the task, based on the deadline set for the task (S820). Afterwards, the work chat room processing apparatus 130 may receive a task display request signal from the task owner or the task assignee (S830). Here, the user may request one or more tasks through the task display request signal. That is, the user may request to view multiple tasks and/or periodic notes through the task display request signal.

The work chat room processing apparatus 130 identifies the current phase of work progress of the task before displaying the task requested by the task display request signal (S840). The phases of work progress of the task may be classified, for example, into Normal, Approaching, and Delay. The work chat room processing apparatus 130 may identify the current phase of work progress of the task with respect to the start date and due date of the task and the current date.

The work chat room processing apparatus 130 may select a color corresponding to the identified current phase of work progress to display the task (S850). If there are two or more tasks requested by the task display request signal, the work chat room processing apparatus 130 may display the tasks in colors corresponding to the current phases of work progress of the respective tasks.

Meanwhile, the work chat room processing apparatus 130 may perform the same operation on a periodic note, and may display the periodic note by using a display method, such as in a color corresponding to the phase of work progress. Afterwards, the work chat room processing apparatus 130 may determine whether the next interval for the periodic note will be started or not. If the next note writing interval is started, the work chat room processing apparatus 130 may repeat the steps S830 to S850. On the other hand, if there is no note writing interval to be started any more and the task has been closed, the entire process may be ended. Also, if the task goes into the approaching phase or the delay phase after a preset period of time since the start of the task, the work chat room processing apparatus 130 may provide a reminder for the deadline for the task to the task assignee. In this instance, the reminder may be displayed in a color corresponding to the current phase of work progress, as is the case with the task.

Likewise, the task may be displayed in a color corresponding to the phase of work progress when it is displayed through a chat room where at least one of the task owner and the task assignee is joining or through an email. Also, a reminder associated with the task may be displayed in a color corresponding the phase of work progress, when displayed through a chat room where at least one of the task owner and the task assignee is joining.

Therefore, especially when multiple tasks are displayed, the user is able to intuitively see the degree of urgency or priorities of multiple tasks by the colors in which the tasks are displayed. Moreover, the user is able to see the schedule and progress of each task at a glance by the colors in which the tasks are displayed.

In addition, the user does not need to individually inform the current phase of work progress of a particular task since the current phase of work progress of the task is displayed in a color. For example, in the case of a task whose deadline has passed, the user may let other task participants know that the task is currently in the delay phase, just by forwarding or sharing the task.

FIGS. 9 to 11B are views illustrating a process of providing work progress status summary information according to the present disclosure.

Referring to FIG. 9, upon an occurrence of a user interaction the work chat room processing apparatus 130 may provide current context information to the work progress status processing part 350 by means of the work processing part 370, receive work progress status summary information, and include the work progress status summary information for each status of work progress in a work chat room list 910 and 920 or a task object list. In FIG. 9, the work chat room list 910 and 920 may be provided through Project and Check tabs, and the task object list may be provided through Plan and Act tabs.

For example, the work chat room list 910 and 920 may provide a list of currently created work chat rooms and at the same time visually provide work progress status summary information 930 and 940 about the plan for each work chat room. Also, the task object list may provide a list of currently created task objects and at the same time visually provide work progress status summary information 930 and 940 about the task for each task object. In this case, the work progress status summary information 930 and 940 may be displayed differently for each status of work progress, and may be displayed in different colors to provide information in an indirect way on how the task objects are distributed throughout the phases of work progress.

Meanwhile, as shown in FIG. 9, the work progress status summary information on the plans and tasks associated with the entire work may be visually displayed on the Plan and Act tabs, respectively. The user may select a particular tab and access the work chat room list 910 and 920 or the task object list within the corresponding tab area, and display and present work progress status summary information individually for the work chat rooms and task objects displayed on each list.

Figure 10A:
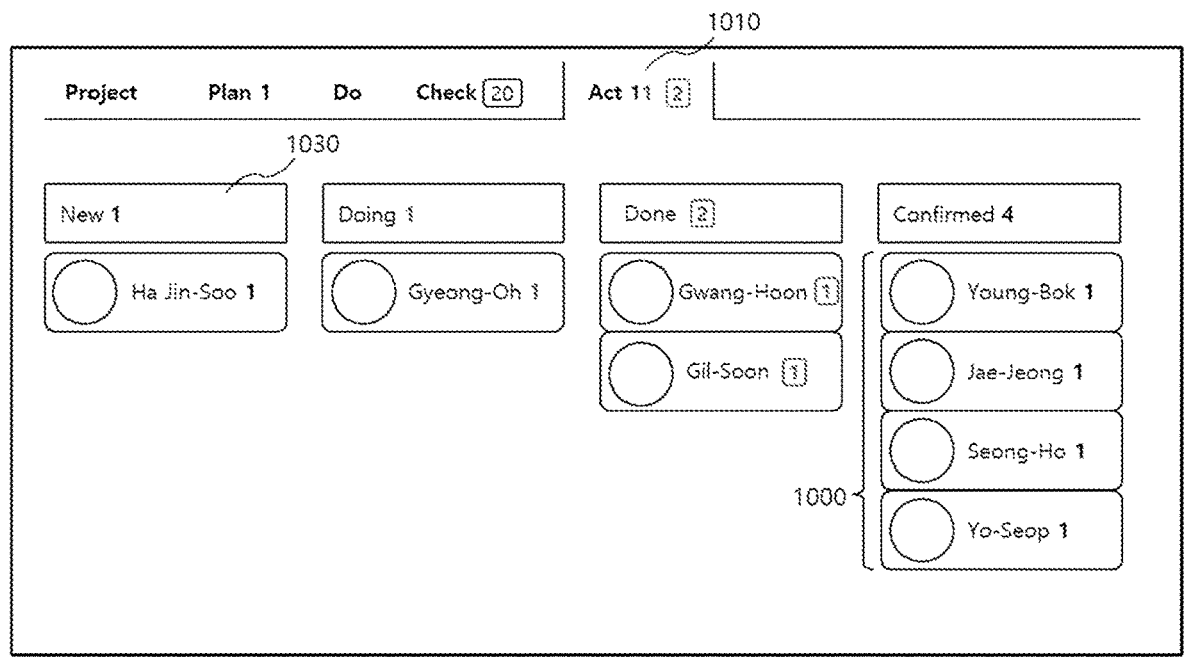

Referring to FIG. 10A, the work chat room processing apparatus 130 may include work progress status summary information in the task object list which classifies the task objects by the status of work progress, by means of the work processing part 370, in response to a user interaction. First of all, the work progress status summary information of the entire task objects may be displayed in an Act tab area 1010 for task object lists. In this case, the work progress status summary information displayed in the Act tab area 1010 may be created only based on the phases of work progress preceding the "Confirmed" phase. When the user selects the Act tab, the corresponding task objects may be displayed as a separate task object list for each status of work progress.

In FIG. 10A, the task objects may be classified and displayed in list form according to the phases 1030 of work progress: "New", "Doing", "Done", and "Confirmed". In this case, the task objects in each list may be grouped by task assignee for each phase 1030 of work progress, and work progress status summary information may be displayed for each group by task assignee as well. Also, work progress status summary information may be displayed at the top of each list of task objects that are grouped by task assignee for each status of work progress.

For example, the task objects in each list may be grouped by task assignee for each phase 1030 of work progress, and if a particular task assignee is selected in response to a user interaction, a full list of task objects associated with this task assignee may be displayed. In this case, a progress bar for the phase of work progress of each task object may be displayed on the task object list associated with the particular task assignee, or may be displayed in a corresponding status color.

Figure 10B:
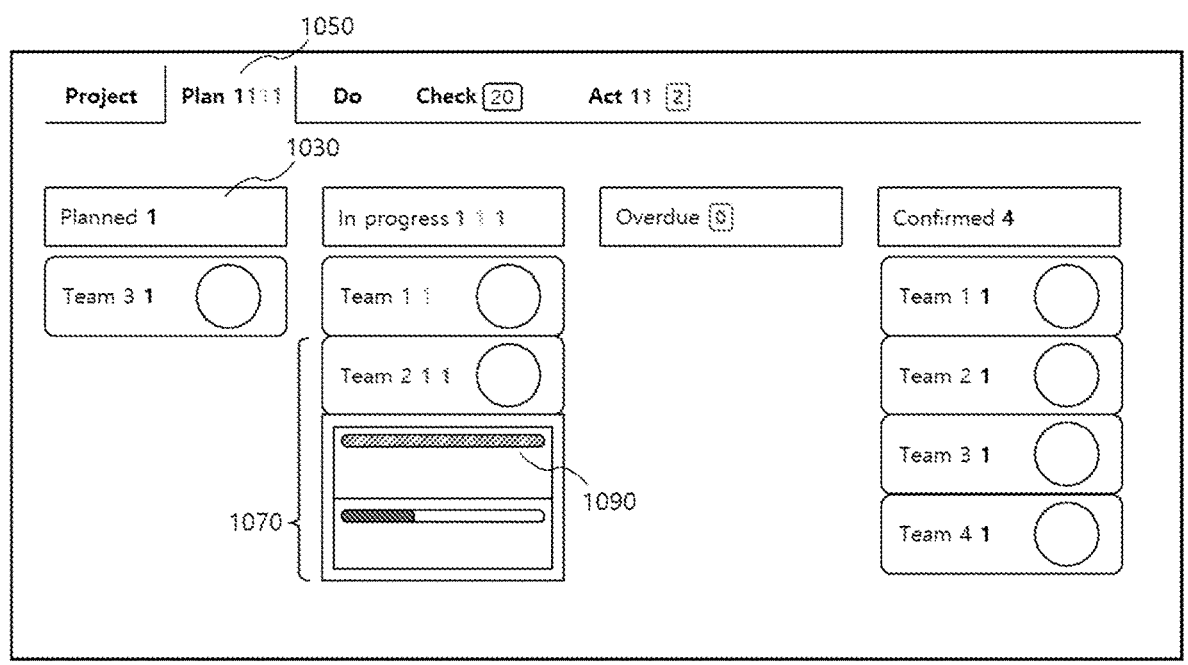

Meanwhile, as shown in FIG. 10B, the task objects in each list provided through a plan tab 1050 may be grouped by team for each phase 1030 of work progress. In this case, if a particular team is selected in response to a user interaction, a task object list 1070 associated with this team may be fully displayed, and a progress bar 1090 for the phase of work progress for each task object may be displayed within the task object list 1070. In this case, the progress bar 1090 may be displayed in different status colors for the different phases of work progress.

Referring to FIGS. 11A and 11B, when a work chat room is opened in response to a user interaction, the work chat room processing apparatus 130 may include work progress status summary information in a work chat room status 1110 and 1140 which classifies task objects by the status of work progress, by means of the work processing part 370. The work chat room status 1110 and 1140 may be displayed at the top of the work chat room, and may correspond to an area configured to display information associated with the work chat room. When the user selects a particular work chat room and accesses this work chat room, messages in the message thread may be sequentially displayed, and messages the user has read and message the user has not read yet may be displayed separately. For example, the messages under a line saying "You have read up to here" in FIG. 11B may be the messages the user has not read yet.

In FIG. 11A, the task object messages displayed in the work chat room may be displayed in different status colors according to the phase of work progress. For example, a task object message 1120 highlighted in blue may correspond to the 'Doing' phase in the progress of work, in which case there is plenty of time until the deadline. A task object message 1130 highlighted in yellow may correspond to the 'Doing' phase in the progress of work, in which case three days or less are left until the deadline, that is, the deadline is approaching. That is, the work chat room processing apparatus 130 may display the task object messages in different status colors in the work chat room according to the phase of work progress, and task followers may keep track of the progress of work associated with them in an indirect way, without accessing the corresponding task object.

Meanwhile, when displaying the messages in the message thread, the work chat room processing apparatus 130 may display task object messages differently from other messages if their status of work progress is completed status. For example, the work chat room processing apparatus 130 may display the task object message 1130 in a different color than the other messages if its status of work progress is completed status. In FIG. 11B, a task object message highlighted in red may include a task object message 1150 displayed only with a red outline because of a delay, even though its status of work progress is "Doing", and a task object message 1160 displayed with a red outline and in red text because its status of work progress is completed status, that is, "Done", and waiting for evaluation.

The work chat room processing apparatus 130 according to the present disclosure may provide visualized information that helps intuitively understand the status of work progress for each task or plan displayed within a work chat room. That is, the work chat room processing apparatus 130 may display a progress bar as well, along with a task or plan displayed within a work chat room, and may display the task or plan in a corresponding status color. Also, the work chat room processing apparatus 130 may provide a work chat room list through the Project and Check tabs and a task object list through the Plan and Act tabs, and may provide work progress status summary information for the work chat room list and the task object list. In this case, the work progress status summary information may include information that is visually presented with a progress bar or a status color.

While the present disclosure has been described above with reference to the exemplary embodiments, it may be understood by those skilled in the art that the present disclosure may be variously modified and changed without departing from the spirit and scope of the present disclosure disclosed in the claims.

The disclosed technology may have the following effects, but this it does not mean that a particular embodiment should include all of or only the following effects. Therefore, the scope of the disclosed technology should not be construed as being limited thereby.

According to an embodiment of the present disclosure, it is possible to display a task schedule at a glance, such as the current progress of work and the remaining days and hours. That is, the present disclosure provides a task management technology that helps manage a task schedule without fail by providing a task assignee with visualized data they can intuitively recognize if the deadline is approaching or has arrived for a task or for each instance of a periodically recurring task.

Furthermore, the present disclosure provides a technology that helps manage a task schedule without fail by visualizing the progress of the schedule through progress bars for multiple tasks that simultaneously occur and providing reminders related to task deadlines

What is claimed is:

1. A work chat room processing apparatus comprising:
   a work chat room processing part configured to process a plurality of work chat rooms set up for each piece of work, each work chat room of the plurality of work chat rooms being implemented through a message thread comprised of a task object message designating a task owner who instructs a task assignee to work on a task with a set due date and the task assignee who is to work on the task and a non-task object message;
   a task object database processing part configured to register a task object in the task object message in a task object database, the task object including the task;
   a work progress status processing part configured to create work progress status summary information based on current context information by searching the task object database; and
   a work processing part configured to, upon occurrence of a user interaction, provide the current context information to the work progress status processing part, receive the work progress status summary information, include the work progress status summary information for each status of work progress of at least one status of work progress in a work chat room list or a task object list, create the work progress status summary information as a progress bar for a phase of work progress set for the task based on a number of days between a current date and the due date, and change an appearance in which the progress bar is displayed in the work progress status summary information based on a change of the phase of the task to another phase of work progress based on a change of how close the number of days between the current date and the due date,
   wherein the work progress status processing part is further configured to display an icon associated with the task and change the display of the icon based on the change of the phase of the task, and
   wherein the work chat room processing part, the task object database processing part, the work progress status processing part, and the work processing part are each implemented via at least one processor.

2. The work chat room processing apparatus of claim 1, wherein the task object database processing part is further configured to determine work chat room identification codes for the work chat rooms and the task owner, the task assignee, and the due date for the task object and store the same in the task object database.

3. The work chat room processing apparatus of claim 1, wherein the work progress status processing part is further configured to create the work progress status summary information for the task object in each stage of a PDCA (Plan-Do-Check-Act) cycle of the work progress.

4. The work chat room processing apparatus of claim 1, wherein the work progress status processing part is further configured to supplement the work progress status summary information by identifying whether the status of work progress in the task object of the at least one status of work progress is completed status or not.

5. The work chat room processing apparatus of claim 1, wherein, once the work chat room list is created through the user interaction, the work processing part is further configured to include the work progress status summary information for task objects of the work chat rooms in the work chat room list.

6. The work chat room processing apparatus of claim 5, wherein the work processing part is further configured to visualize the work progress status summary information for different phases distinguished by the number of days between the current date and the task's due date in the task object is.

7. The work chat room processing apparatus of claim 1, wherein, once the task object list is created through the user interaction, the work processing part is further configured to include the work progress status summary information in the task object list which classifies task objects by each of the status of work progress.

8. The work chat room processing apparatus of claim 7, wherein the work processing part is further configured to include the work progress status summary information in the task object list which classifies the task objects by task assignee for each status of work progress.

9. The work chat room processing apparatus of claim 1, wherein, once the work chat room is set up through the user interaction, the work processing part is further configured to include the work progress status summary information in the status of the work chat room which classifies the task objects by each status of work progress.

10. The work chat room processing apparatus of claim 9, wherein the work processing part is further configured to visualize the task object message in the message thread of the work chat room, based on the status of work progress of the task object changing to completed status.

11. The work chat room processing apparatus of claim 9, wherein the work processing part is further configured to detect receipt of the user interaction for a particular task object message in the message thread of the work chat room and then include work progress status summary information for the task object in the task object's message status of the particular task object message.

12. A work chat room processing method comprising:
processing a plurality of work chat rooms set up for each piece of work, each work chat room of the plurality of work chat rooms being implemented through a message thread comprised of a task object message designating a task owner who instructs a task assignee to work on a task with a set due date and the task assignee who is to work on the task and a non-task object message;
registering a task object in the task object message in a task object database;
creating work progress status summary information based on current context information by searching the task object database, the task object including the task;
upon occurrence of a user interaction, providing the current context information for the creating of the work progress status summary information, receiving the work progress status summary information, including the work progress status summary information for each status of work progress in a work chat room list or a task object list, creating the work progress status summary information as a progress bar for a phase of work progress set for the task based on a number of days between a current date and the due date, and changing an appearance in which the progress bar is displayed in the work progress status summary information based on a change of the phase of the task to another phase of work progress based on a change of the number of days between the current date and the due date; and
displaying an icon associated with the task and changing the display of the icon based on the change of the phase of the task.

13. A non-transitory computer-readable medium having embodied thereon a program, which when executed by a computer causes the computer to execute a work chat room processing method, the method comprising:
processing a plurality of work chat rooms set up for each piece of work, each work chat room of the plurality of work chat rooms being implemented through a message thread comprised of a task object message designating a task owner who instructs a task assignee to work on a task with a set due date and the task assignee who is to work on the task and a non-task object message;
registering a task object in the task object message in a task object database;
creating work progress status summary information based on current context information by searching the task object database, the task object including the task;
upon occurrence of a user interaction, providing the current context information for the creating of the work progress status summary information, receiving the work progress status summary information, including the work progress status summary information for each status of work progress in a work chat room list or a task object list, creating the work progress status summary information as a progress bar for a phase of work progress set for the task based on a number of days between a current date and the due date, and changing an appearance in which the progress bar is displayed in the work progress status summary information based on a change of the phase of the task to another phase of work progress based on a change of the number of days between the current date and the due date; and
displaying an icon associated with the task and changing the display of the icon based on the change of the phase of the task.

* * * * *